(No Model.)
W. H. HOWELL.
APPARATUS FOR MAKING BISULPHITE OF LIME.
No. 487,887. Patented Dec. 13, 1892.
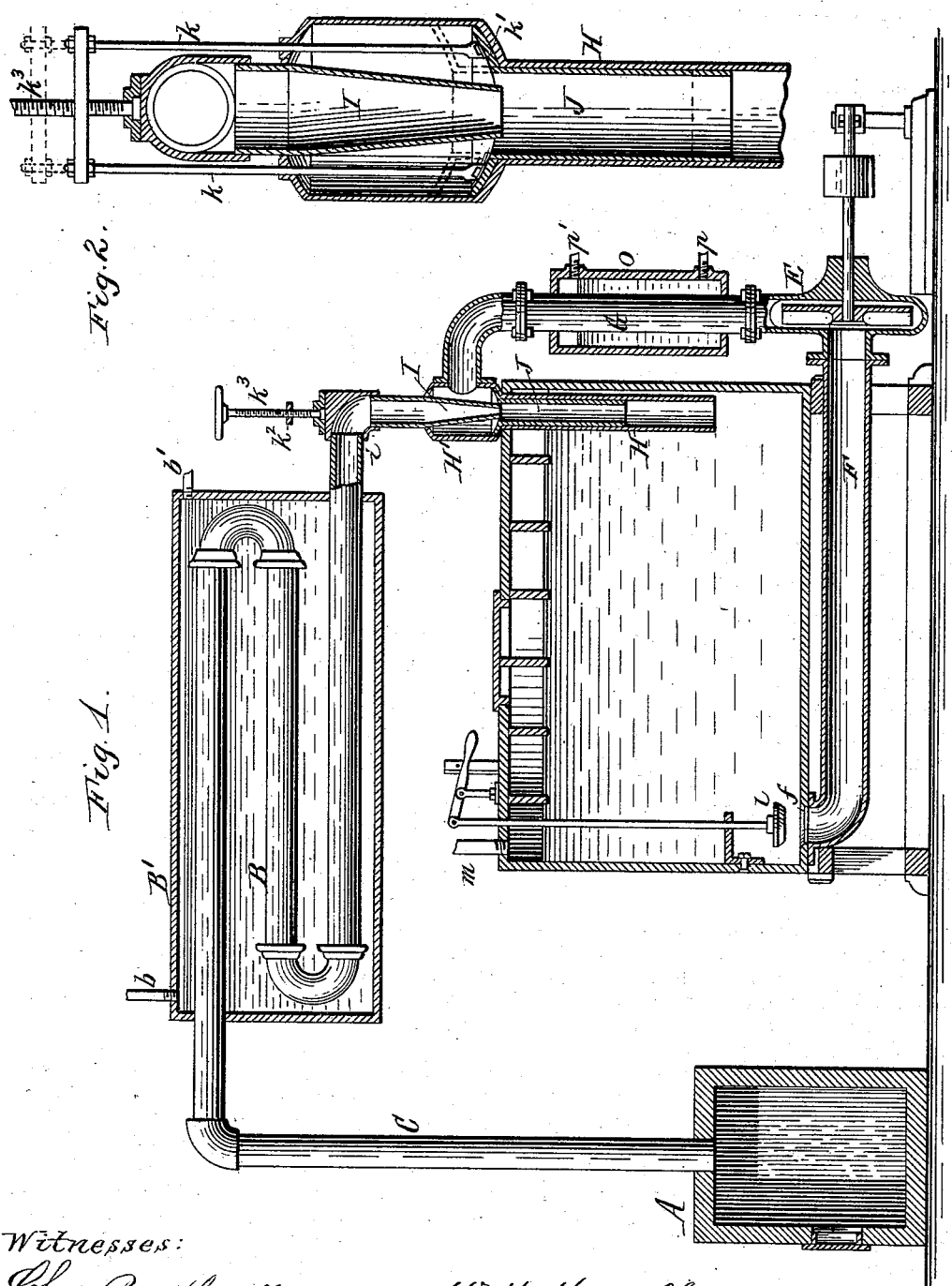

UNITED STATES PATENT OFFICE.

WILLIAM H. HOWELL, OF THOROLD, CANADA, ASSIGNOR OF ONE-HALF TO ANDREW HANSEL, OF SAME PLACE.

APPARATUS FOR MAKING BISULPHITE OF LIME.

SPECIFICATION forming part of Letters Patent No. 487,887, dated December 13, 1892.

Application filed May 16, 1892. Serial No. 433,257. (No model.)

*To all whom it may concern:*

Be it known that I, WILLIAM H. HOWELL, a citizen of the Dominion of Canada, residing at Thorold, in the Province of Ontario, Canada, have invented a new and useful Improvement in an Apparatus for Making Bisulphite of Lime, of which the following is a specification.

This invention relates to an improved apparatus for producing bisulphite of lime, and which involves what is known as the "vacuum process," in which sulphurous-acid gas is drawn from the furnace or retort by a pump and brought in contact with milk of lime for producing bisulphite of lime.

The object of my invention is to more effectually expose the sulphurous-acid gas to the milk of lime, so as to cause the gas to be absorbed more rapidly, and thereby expedite the process of making the bisulphite of lime.

In the accompanying drawings, Figure 1 is a longitudinal sectional elevation of my improved apparatus. Fig. 2 is an enlarged vertical section of the inlet-pipe and regulating-valve of the receiving-tank, the plane of section being at right angles to Fig. 1.

Like letters of reference refer to like parts in both figures.

A is a retort or furnace in which sulphur or sulphurous ore is burned in the usual manner for producing sulphurous-acid gas. This furnace may be of any ordinary construction.

B is a condenser or cooler to which the gases or fumes generated in the retort A are conducted by a pipe or conduit C. This cooler preferably consists of a number of coils or pipes, which are immersed in a water-tank B', through which a current of water is caused to circulate, the tank being provided for this purpose with an inlet-pipe $b$ and a waste-pipe $b'$.

D is a tank or receiver, which contains milk of lime, and E is a centrifugal or rotary pump, whereby the sulphurous-acid gas is drawn from the chamber B into the tank D, and whereby the milk of lime is caused to circulate through said tank for repeatedly bringing the same in contact with fresh volumes of sulphurous-acid gas.

The pump E may be of any common and well-known construction and is driven in any convenient manner.

F is the suction-pipe of the pump, which communicates with a discharge-opening $f$, formed in the bottom of the tank D, and G is the delivery-pipe of the pump, which leads to an inlet-pipe H, extending into the tank D from the top thereof. The upper portion of this inlet-pipe is provided with an enlargement or casing H', and within this is arranged a tapering nozzle-casing I, which is connected with the discharge end of the cooling-coil B by a pipe $i$. The upper end of the delivery-pipe G of the pump enters the side of the casing H', and the nozzle I is arranged axially in the casing and extends a short distance beyond the adjacent end of the delivery-pipe.

J is a valve arranged in the casing H' for regulating the flow of the liquid through the inlet-pipe H. This valve consists of a tube, which is guided in the inlet-pipe H and surrounds the tapering nozzle I with its upper portion, so that upon raising or lowering the tube the annular space or passage between the outer surface of the nozzle and the upper end of the tube is contracted or enlarged, owing to the tapering form of the nozzle.

$k$ are upright rods secured at their lower ends to a flange $k'$, formed at the upper end of the tubular valve J and extending upwardly through stuffing-glands arranged in the top of the casing, the upper ends of said rods being connected together by a yoke or cross-bar $k^2$.

$k^3$ is an adjusting-screw arranged in a threaded opening in the cross-bar $k^2$ and bearing with its inner end against the top of the casing H'. This screw is provided at its outer end with arms or a hand-wheel for turning it. Upon turning the screw in one or the other direction the valve is raised or lowered through the medium of the rods $k$, and the quantity of liquid admitted to the inlet-pipe of the tank D is regulated accordingly.

$l$ is a valve applied to the discharge-opening $f$ of the tank D, whereby the suction-pipe of the pump may be shut off from the tank for making repairs or for other purposes.

$m$ is an exit-pipe arranged at the top of the tank D for permitting the escape of any gases which will not combine with the milk of lime.

O is a cooler surrounding the delivery-pipe G of the pump, and whereby the liquid is cooled as it passes through said pipe. This cooler preferably consists of a cylindrical water-chamber provided at one end with a supply-pipe $p$ and at its opposite end with a waste-pipe $p'$.

Upon setting the centrifugal pump in operation, the milk of lime contained in the tank D is withdrawn from the latter through the suction-pipe F of the pump and again returned to the same through the delivery-pipe G and the inlet-pipe H of the tank, the liquid being in this manner constantly circulated through the tank. The rapid flow of the liquid through the inlet-pipe H produces a partial vacuum at the mouth of the nozzle I, which causes the cooled sulphurous-acid gas to be drawn from the condenser B into the inlet-pipe H, thereby bringing the gas in contact with the milk of lime and forming bisulphite of lime. As the discharge-nozzle for the gas is arranged axially in the inlet-pipe the inflowing milk of lime completely surrounds the nozzle. The jet of sulphurous-acid gas issuing from the nozzle is thus enveloped on all sides by the milk of lime and kept in intimate contact therewith, thereby effecting a larger and more thorough absorption of the gas by the milk of lime and shortening the time required to obtain a product of given strength. The strength of the milk of lime is gradually increased by the repeated contact of the circulating liquor with the fresh volumes of sulphurous gas issuing from the nozzle I in a well-known manner.

The velocity of the circulating liquid and the volume of milk of lime delivered into the inlet-pipe of the tank in proportion to the volume of sulphurous-acid gas can be readily regulated by means of the valve J.

The rapid circulation of the milk of lime and the chemical union of the elements in the tank D cause the milk of lime to be heated, which reduces its absorbing capacity, and in order to keep it at the desired low temperature the cooler O is provided, whereby the liquid is cooled before it is again delivered into the tank.

I claim as my invention—

1. In an apparatus for producing bisulphite of lime, the combination, with a retort or furnace for burning sulphur, of a receiver for containing milk of lime, having an inlet and an outlet, a nozzle or jet-pipe arranged in said inlet and connected with the retort or furnace, and a pump having a suction-pipe connected with the outlet of said tank, and a delivery-pipe connected with the inlet thereof, whereby a circulation of the milk of lime through the tank is produced, substantially as set forth.

2. In an apparatus for producing bisulphite of lime, the combination, with a retort or furnace for burning sulphur, of a cooler or condenser connected with said retort and receiving the acid fumes from the same, a receiver for containing milk of lime, having an inlet-pipe, a pump whereby the milk of lime is delivered through said pipe, and a nozzle or jet-pipe arranged in said inlet-pipe and receiving the sulphurous-acid gas from the cooler, substantially as set forth.

3. In an apparatus for producing bisulphite of lime, the combination, with a retort or furnace for burning sulphur, of a cooler or condenser connected with said retort and receiving the acid fumes from the same, a receiver for containing milk of lime, having an inlet-pipe, a pump whereby the milk of lime is delivered through said pipe, a nozzle or jet-pipe arranged in said inlet-pipe and receiving the sulphurous-acid gas from the cooler, and a valve arranged in said inlet-pipe, whereby the velocity of the inflowing liquid is regulated, substantially as set forth.

4. In an apparatus for producing bisulphite of lime, the combination, with a retort or furnace, of a receiver for containing milk of lime, having an inlet-pipe provided with a valve-casing, a pump whereby the milk of lime is directed through said inlet-pipe, a tapering nozzle or jet-pipe arranged in said valve-casing and receiving the sulphurous-acid gas from the retort, and a tubular regulating-valve sliding in said inlet-pipe and surrounding the tapering nozzle and having an actuating rod or stem extending through said valve-casing, substantially as set forth.

5. In an apparatus for producing bisulphite of lime, the combination, with a retort or furnace for burning sulphur and a cooler which receives the sulphurous-acid gas from the retort, of a receiver for containing milk of lime, having an inlet-pipe, a nozzle arranged in said inlet-pipe and receiving the gas from the cooler, a pump whereby the milk of lime is circulated through the receiver, and a cooler applied to the pipe or conduit between the pump and the receiver, substantially as set forth.

Witness my hand this 23d day of April, 1892.

WILLIAM H. HOWELL.

Witnesses:
FRED. C. GEYER,
EMIL NEUHART.